United States Patent
Chang et al.

(10) Patent No.: US 8,967,329 B2
(45) Date of Patent: Mar. 3, 2015

(54) SOUND ABSORBING AND SOUND BLOCKING REINFORCED BOARD FOR VEHICLE AND METHOD MANUFACTURING THE SAME

(71) Applicants: Hyundai Motor Company, Seoul (KR); Kia Motors Corporation, Seoul (KR)

(72) Inventors: Jae-Eun Chang, Gwangmyeong-si (KR); Hong-Mo Koo, Hwasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/077,815

(22) Filed: Nov. 12, 2013

(65) Prior Publication Data

US 2014/0326535 A1    Nov. 6, 2014

(30) Foreign Application Priority Data

May 6, 2013    (KR) .......................... 10-2013-0050397

(51) Int. Cl.
   *E04B 1/82*    (2006.01)
(52) U.S. Cl.
   USPC .......................................... 181/290; 181/284
(58) Field of Classification Search
   CPC ........................................................ E04B 1/86
   USPC ................................................. 181/290, 284
   See application file for complete search history.

(56) References Cited

U.S. PATENT DOCUMENTS

| | | | | |
|---|---|---|---|---|
| 5,554,830 | A * | 9/1996 | Muller et al. ................. | 181/290 |
| 8,695,757 | B2 * | 4/2014 | Duval et al. .................. | 181/290 |
| 8,695,758 | B2 * | 4/2014 | Fushiki ......................... | 181/290 |
| 8,739,924 | B2 * | 6/2014 | Johnson ........................ | 181/290 |
| 2004/0168853 | A1 * | 9/2004 | Gunasekera et al. ......... | 181/290 |
| 2005/0046218 | A1 * | 3/2005 | Campbell ..................... | 296/39.3 |
| 2005/0064779 | A1 * | 3/2005 | Allison et al. ................ | 442/181 |
| 2005/0263346 | A1 * | 12/2005 | Nishimura .................... | 181/290 |
| 2009/0250292 | A1 * | 10/2009 | Hayasaka et al. ............. | 181/290 |
| 2012/0234626 | A1 * | 9/2012 | Ishikawa et al. .............. | 181/290 |

FOREIGN PATENT DOCUMENTS

| KR | 10-2002-0047937 A | 6/2002 |
|---|---|---|
| KR | 10-2003-0008138 A | 1/2003 |
| KR | 10-2012-0095522 A | 8/2012 |

* cited by examiner

*Primary Examiner* — Forrest M Phillips
(74) *Attorney, Agent, or Firm* — McDermott Will & Emery LLP (57) ABSTRACT

A sound absorbing and sound blocking reinforced board for a vehicle is provided, which has advantages of simultaneously satisfying sound absorbing properties. The sound absorbing and sound blocking reinforced board is capable of reducing environmental pollutants and improving economic efficiency by including a sound absorbing layer, which includes a recycled polyurethane foam, a binding material, a web forming material, and a rigid reinforcement material; and a sound blocking layer.

9 Claims, 6 Drawing Sheets

SOUND ABSORBING AND SOUND BLOCKING REINFORCED BOARD FOR VEHICLE AND METHOD MANUFACTURING THE SAME

CROSS-REFERENCE TO RELATED APPLICATION

This application claims priority under 35 U.S.C. §119 to Korean Patent Application No. 10-2013-0050397, filed on May 6, 2013, in the Korean Intellectual Property Office, the disclosure of which is incorporated herein by reference in its entirety.

TECHNICAL FIELD

The present disclosure relates to a sound absorbing and sound blocking reinforced board for a vehicle and a method of manufacturing the same, and more particularly, to a sound absorbing and sound blocking reinforced board for a vehicle which may secure a performance equivalent to a sound absorbing and sound blocking material in the related art and reduce environmental pollutants by including a sound absorbing layer which includes a recycled polyurethane foam, a binding material, a web forming material, and a rigid reinforcement material, and a sound blocking layer to apply the recycled polyurethane foam on a polypropylene board having sound blocking property, and a method of manufacturing the same.

BACKGROUND

In a vehicle, absorbing and blocking sound is important. In order to prevent noise generated while driving a vehicle, various forms of sound absorbing and sound blocking members having excellent sound absorbing and sound blocking properties have been applied.

The sound absorbing property refers to a property of absorbing sound by an object or a porous material such as glass fiber or rock wool having numerous small holes therein, which has sufficient sound absorbing property. When a thin metal plate, plywood or the like is in close contact with a solid object, sound absorbing property is weak. However, an air layer as a sound spring created between a porous material and a solid object with a certain gap therebetween may absorb sound energy, thereby increasing sound absorbing property.

The sound blocking property refers to a property of blocking sound by an object. An object having no holes has sufficient sound blocking property which can be further enhanced by increasing the weight per unit area.

In order to manufacture a material with sound absorbing and sound blocking properties in the related art, a sound blocking layer is used, and a skin layer composed of a non-woven fabric and the like is added thereto. The material with sound absorbing and sound blocking properties has been manufactured by separately constituting a sound absorbing layer and attaching the sound absorbing layer to the sound blocking layer, which is a cumbersome process.

As social interests in the environment are increasing, and law and regulations regarding the environment become stricter, a technology reducing emission of environmental pollutants by recycling resources has been continuously developing.

Korean Patent No. 10-0246144 discloses a sound absorbing and sound blocking material obtained by recycling waste rubber. Adding calcium carbonate ($CaCO_3$) and a hollow fiber into waste rubber have been introduced to improve insufficient sound blocking property and sound absorbing property. However, the process is cumbersome and complicated.

SUMMARY

The present disclosure provides a sound absorbing and sound blocking reinforced board for a vehicle to which sound absorbing property is improved by including a sound absorbing layer, which includes a recycled polyurethane foam, a binding material, a web forming material, and a rigid reinforcement material, and a sound blocking layer and applying the recycled polyurethane foam on a polypropylene board having sound blocking property, and a method of manufacturing the same.

According to an exemplary embodiment of the present disclosure, a sound absorbing and sound blocking reinforced board for a vehicle includes a sound absorbing layer and a sound blocking layer. The sound absorbing layer includes a recycled polyurethane foam, a binding material, a web forming material, and a rigid reinforcement material.

The binding material may be a low melting polyethylene terephthalate, the web forming material may be polyethylene terephthalate or polypropylene, and the rigid reinforcement material may be kenaf.

The polyurethane foam, the low melting polyethylene terephthalate, the polypropylene, and the kenaf may be present in amounts from 40% by weight to 60% by weight, from 5% by weight to 20% by weight, from 5% by weight to 40% by weight, and from 10% by weight to 40% by weight, respectively, based on the total weight of the sound absorbing layer.

The sound blocking layer may include polypropylene and kenaf. The polypropylene and the kenaf may be present in amounts from 30% by weight to 70% by weight and from 30% by weight to 70% by weight, respectively, based on the total weight of the sound blocking layer.

The recycled polyurethane foam may have a cell structure having a size from 1 mm to 5 mm. The low melting polyethylene terephthalate may have a fiber structure having a size from 4 denier to 7 denier, the polypropylene may have a fiber structure having a size from 4 to 9 denier, and the kenaf may have a fiber structure.

Further, weight ratio of the sound absorbing layer to the sound blocking layer may be 1:0.3 to 2.0.

The board may further include a film containing nylon or polypropylene positioned between the sound absorbing layer and the sound blocking layer and a bead positioned on one side of the sound absorbing layer.

According to another exemplary embodiment of the present disclosure, a method of manufacturing a sound absorbing and sound blocking reinforced board for a vehicle includes a first step of manufacturing a sound absorbing and sound blocking layer by binding a sound absorbing layer and a sound blocking layer, and then preheating and compressing the sound absorbing layer and the sound blocking layer in an oven. A second step manufactures a sound absorbing and sound blocking reinforced board by cold forming the sound absorbing and sound blocking layer using a mold.

In accordance with yet another exemplary embodiment of the present disclosure, a method of manufacturing a sound absorbing and sound blocking reinforced board for a vehicle includes a first step of manufacturing a sound absorbing and sound blocking layer by preheating and compressing a sound absorbing layer and a sound blocking layer, respectively, in an oven, and then binding the sound absorbing layer and the sound blocking layer. A second step manufactures a sound absorbing and sound blocking reinforced board by cold forming the sound absorbing and sound blocking layer using a mold.

The sound absorbing layer may include a recycled polyurethane foam, a binding material, a web forming material, and a rigid reinforcement material.

A polyurethane foam, which is a main component of a sound absorbing material according to the present disclosure, is recycled from a waste seat foam of an unused vehicle, thus reducing environmental pollutants and $CO_2$ generated by an average of 165 kg per vehicle.

Costs can be reduced by adding a recycled polyurethane form as a sound absorbing layer, which has equivalent properties to polyethylene terephthalate used as a sound absorbing material in the related art, on a reinforced board consisting of polypropylene having sound blocking property.

Regulations for end-of-life vehicle treatment can be actively managed, and a ratio of recycling unused vehicles is enhanced due to recycling of the polyurethane foam of the waste seat foam generated from unused vehicles.

Furthermore, cost per vehicle produced can be reduced when the recycled polyurethane foam is applied to a package tray, a luggage partition, a luggage board, and the like, of a vehicle.

DETAILED DESCRIPTION

Terms or words used in the present specification and claims should not be interpreted as being limited to typical or dictionary meanings but should be interpreted as meanings and concepts which comply with the technical spirit of the present disclosure, based on the principle that an inventor can appropriately define a concept of a term to describe his/her own inventive concept in the best manner.

Hereinafter, the present disclosure will be described in detail with reference to Tables and drawings.

An aspect of the present disclosure relates to a sound absorbing and sound blocking reinforced board for a vehicle.

According to the present disclosure, a sound absorbing layer includes a polyurethane foam for sound absorbing property, a binding material for binding a composition, a web forming material for formability of the composition, a rigid reinforcement material for enhancing rigidity of the composition, and the like. A sound blocking layer includes polypropylene for sound blocking property, kenaf for enhancing rigidity, and the like. The polyurethane foam may be a recycled polyurethane foam in terms of resource recycling and economic efficiency. Constituent components and content ranges of the present disclosure are summarized in Table 1 for better understanding.

TABLE 1

| Classification | Constituent component | Content range |
|---|---|---|
| Sound absorbing layer | Recycled polyurethane foam | From 40% by weight to 60% by weight |
| | Binding material | From 5% by weight to 20% by weight |
| | Web forming fiber material | From 5% by weight to 40% by weight |
| | Rigid reinforcement material | From 10% by weight to 40% by weight |
| Sound blocking layer | Polypropylene | From 30% by weight to 70% by weight |
| | Kenaf | From 30% by weight to 60% by weight |

Table 1 shows the constituent components and content ranges of the sound absorbing layer and the sound blocking layer. The binding material of the sound absorbing layer may be a low melting polyethylene terephthalate (LM PET), the web forming material may be polyethylene terephthalate (PET) or polypropylene, and the rigid reinforcement material may be kenaf or the like.

Figure 1:
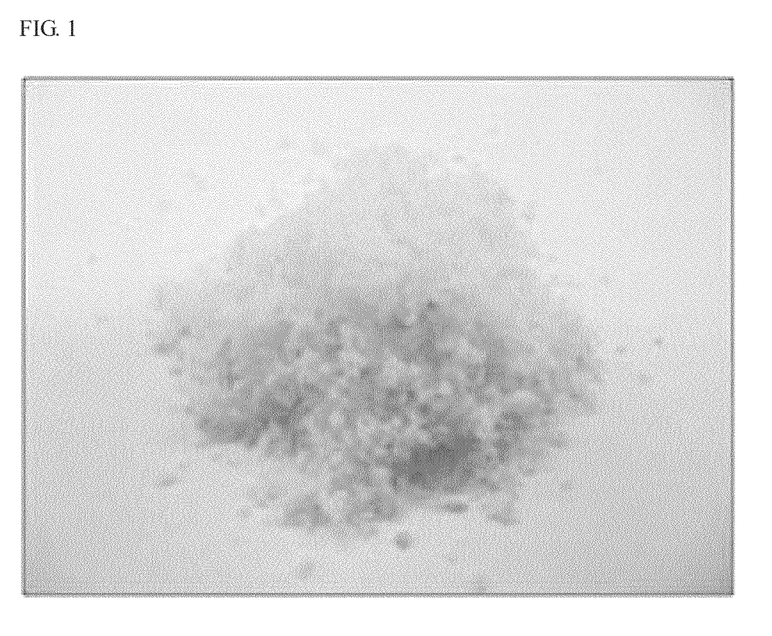
FIG. 1 is a photograph of recycled pulverized polyurethane foam.

More specifically, the recycled polyurethane foam of the sound absorbing layer is a main material of the sound absorbing layer and absorbs sound due to excellent sound absorbing property. The recycled polyurethane foam may be obtained by finely pulverizing seat foam from an unused vehicle. FIG. 1 is a photograph of a recycled pulverized polyurethane foam with a cell structure having a size from 1 to 5 mm.

The recycled polyurethane foam may be present in an amount from 40% by weight to 60% by weight or from 50% to 60% by weight based on the total weight of the sound absorbing layer. When the content of the polyurethane foam is less than 40% by weight, a recycling and a sound absorption ratio are low. When the content thereof exceeds 60% by weight, rigidity of the sound absorbing layer may be insufficient due to the content of other sound absorbing layer materials.

Figure 2:
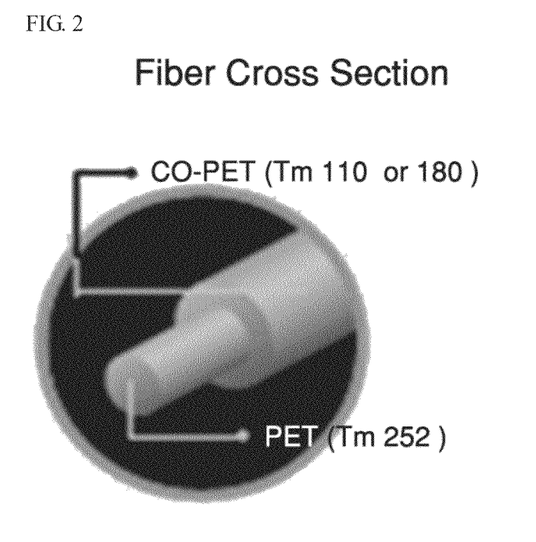
FIG. 2 is a view illustrating a low melting polyethylene terephthalate.

The binding material of the sound absorbing layer may be a low melting polyethylene terephthalate and the like and binds materials such as the sound absorbing layer and the sound blocking layer. FIG. 2 is a view of the low melting polyethylene terephthalate. The low melting polyethylene terephthalate may have a fiber structure having a size from 4 denier to 7 denier.

The low melting polyethylene terephthalate may be present from 5% by weight to 20% by weight or from 10% to 20% by weight based on the total weight of the sound absorbing layer. When the content of the low melting polyethylene terephthalate is less than 5% by weight, adhesion between materials may not be sufficient, and when the content thereof exceeds 20% by weight, adhesion between materials is saturated. Production costs of the sound absorbing material may be increased due to the use high-priced low melting polyethylene terephthalate in a large amount.

Figure 3:
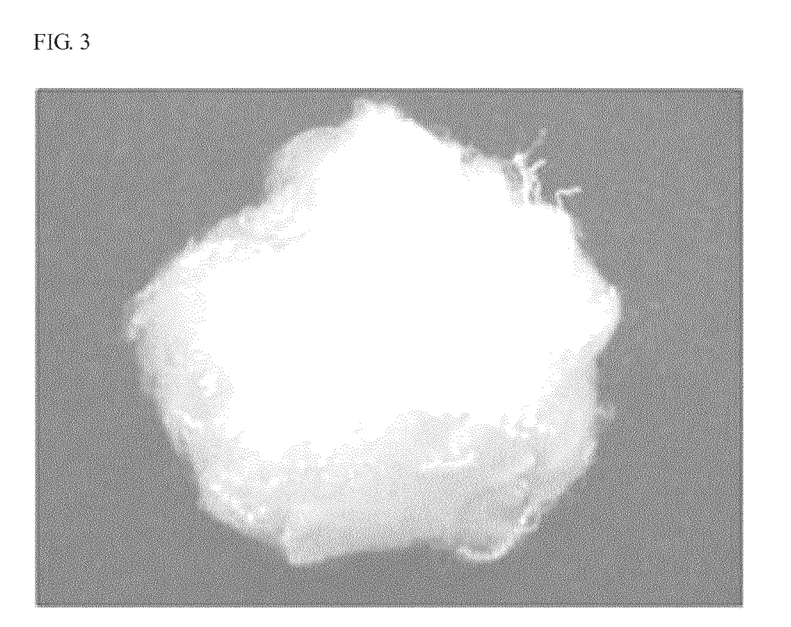
FIG. 3 is a photograph of polypropylene fiber.

The web forming material may be polyethylene terephthalate or polyethylene, improves formability of the sound absorbing layer, and maintains the shape of the sound absorbing layer after forming. FIG. 3 is a photograph of polypropylene fiber with a fiber structure having a size from 4 denier to 7 denier.

The polypropylene may be present from 5% by weight to 40% by weight or from 10% to 40$ by weight based on the total weight of the sound absorbing layer. When the content of the polypropylene is less than 5% by weight, satisfactory formability and shape-retentivity after forming may be insufficient. When the content thereof exceeds 40% by weight, rigidity of the sound absorbing material may be insufficient and the recycled polyurethane foam may have a ratio problem, thereby reducing the sound absorbing property.

Figure 4:
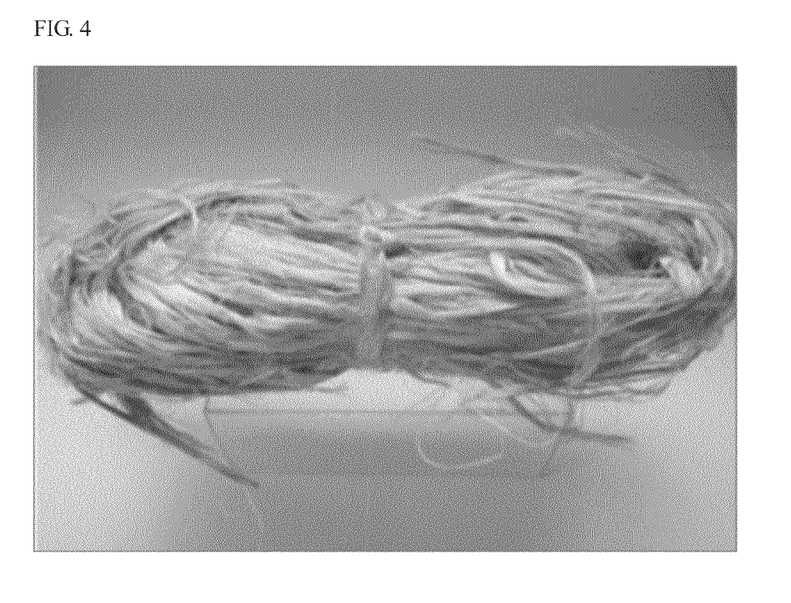
FIG. 4 is a photograph of kenaf.

The rigid reinforcement material of the sound absorbing layer may be kenaf or the like which increases rigidity of the sound absorbing layer as a web after blending and forming FIG. 4 is a photograph of kenaf which having a fiber structure.

Here, the kenaf may be present in an amount from 10% by weight to 40% by weight or from 30% to 40% by weight based on the total weight of the sound absorbing layer. When the content of the kenaf is less than 10% by weight, rigidity of the sound absorbing material may not insignificantly increase. When the content thereof exceeds 40% by weight, the rigidity may be increased, but the polyurethane foam and the polypropylene may have a ratio problem.

The sound blocking layer has a sound blocking property and may include polypropylene and the like to retain the shape after forming.
Here, the polypropylene may be present in an amount from 30% by weight to 70% by weight or from 40% to 70% by weight based on the total weight of the sound blocking layer. When the content of the polypropylene is less than 30% by weight, sound blocking property may be insufficient, and thus formality and shape-retentivity after forming of the sound blocking layer may be insufficient. When the content thereof exceeds 70% by weight, the content of the kenaf is decreased, and thus rigidity of the sound blocking layer may be insufficient.

The sound blocking layer increases rigidity of the sound blocking layer as a web after blending and forming, and may include kenaf and the like. Here, the kenaf may be present in an amount from 30% by weight to 70% by weight or from 60% to 70% by weight based on the total weight of the sound blocking layer. When the content of the kenaf is less than 30% by weight, rigidity of the sound blocking layer may be insufficient, and when the content thereof exceeds 70% by weight, the content of the polypropylene is relatively insufficient, and as a result, the sound blocking property become insufficient.

Binding weight ratios of the sound absorbing layer and the sound blocking layer are described in Table 2.

TABLE 2

| | Sound absorbing layer | | | | | Sound blocking layer | | | Total | | Maximum |
|---|---|---|---|---|---|---|---|---|---|---|---|
| Example | PU (wt %) | LM PET (wt %) | PP (wt %) | kenaf (wt %) | Weight (g) | PP (wt %) | kenaf (wt %) | Weight (g) | weight (g) | Weight ratio | load (kgf) |
| 1 | 50 | 10 | 10 | 30 | 600 | 40 | 60 | 700 | 1,300 | 1:1.17 | 4.4 |
| 2 | | | | | 800 | | | 500 | 1,300 | 1:0.63 | 5.0 |
| 3 | | | | | 800 | | | 600 | 1,400 | 1:0.75 | 6.2 |
| 4 | | | | | 800 | | | 700 | 1,500 | 1:0.88 | 5.9 |
| 5 | | | | | 1,000 | | | 400 | 1,400 | 1:0.40 | 5.7 |
| 6 | | | | | 1,000 | | | 500 | 1,500 | 1:0.50 | 5.9 |
| 7 | | | | | 1,000 | | | 600 | 1,600 | 1:0.60 | 6.2 |
| 8 | | | | | 1,000 | | | 700 | 1,700 | 1:0.70 | 6.3 |
| 9 | | | | | 800 | | | 400 | 1,200 | 1:0.50 | 4.3 |

PU: Recycled polyurethane foam
LM PET: Low melting polyethylene terephthalate
PP: Polypropylene
Kenaf: Hibiscus cannabinus
Weight: weight of 1 m x 1 m
Weight ratio: weight ratio of sound absorbing layer to sound blocking layer Table 2 shows the constituent components, contents, and binding weight ratios of the sound absorbing layer and the sound blocking layer according to embodiments of the present disclosure.

The sound absorbing layer may include: 50% by weight of a recycled polyurethane foam, which is a basic material of the sound absorbing layer and has sound absorbing property; 10% by weight of the low melting polyethylene terephthalate, which is a binding material; 10% by weight of the polypropylene which is a web forming fiber material; and 30% by weight of the kenaf which is a rigid reinforcement material and the like, based on the total weight of the sound absorbing layer. The sound blocking layer may include 40% by weight of the polypropylene having shape-retentivity and sound blocking property, and 60% by weight of kenaf for reinforcing rigidity and the like, based on the total weight of the sound blocking layer.

In addition, the sound absorbing layer and the sound blocking layer having the constituent components and contents may be manufactured as a sound absorbing and sound blocking reinforced board by cold forming and the like. A weight ratio of the sound absorbing layer to the sound blocking layer to be bonded may be 1:0.3 to 2.0 or 1:0.4 to 1.17. When the weight ratio of the sound blocking layer is less than 0.3, sound blocking property may be insufficient, and when the weight ratio thereof exceeds 2.0, sound absorbing property may be insufficient.

When comparing the natural fiber reinforced board in the related art having a maximum load from 5.7 kgf to 6.5 kgf with the present disclosure having a maximum load from 4.3 kgf to 6.3 kgf, the present disclosure has a strength equivalent to that of the natural fiber reinforced board in the related art even though a recycled polyurethane is incorporated.

Figure 5:
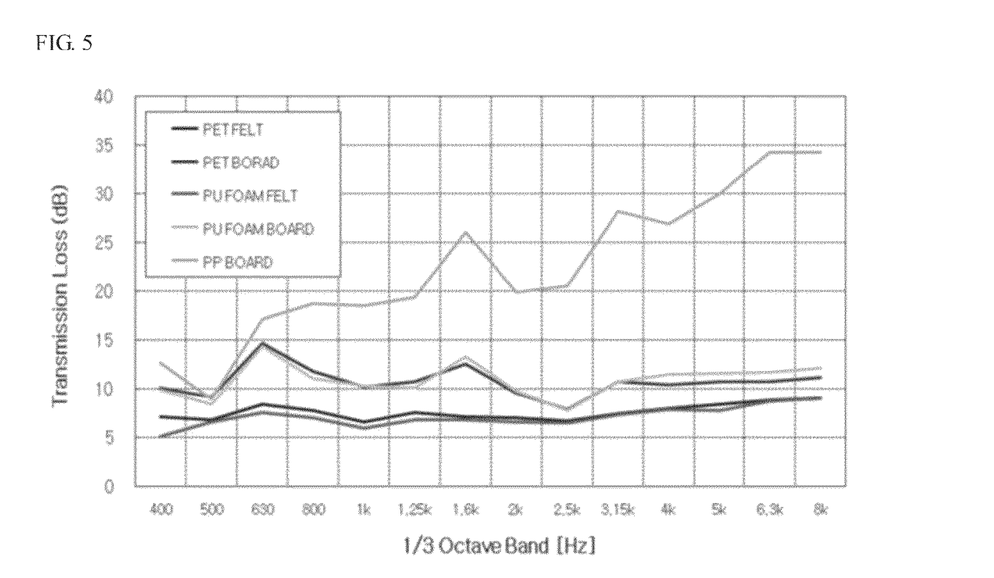
FIG. 5 is a graph showing transmission losses of a polypropylene board, a polyethylene terephthalate board, and a polyurethane board using a simple sound blocking test apparatus (Apamat-II).

Meanwhile, FIG. 5 is a graph showing transmission loss of a polypropylene board, a polyethylene terephthalate board, and a polyurethane board using a simple sound blocking test apparatus (Apamat-II). The horizontal axis of FIG. 5 indicates a change in frequencies of sound as an octave band, and the vertical axis of FIG. 5 indicates the amount of transmission loss. As the graph climbs upward, sound blocking property improves.

Therefore, since the value of the polypropylene board is higher than those of the polyethylene terephthalate board and the polyurethane board in all frequency regions, the sound blocking property of the polypropylene board is higher than those of the polyethylene terephthalate board and the polyurethane board.

Figure 6:
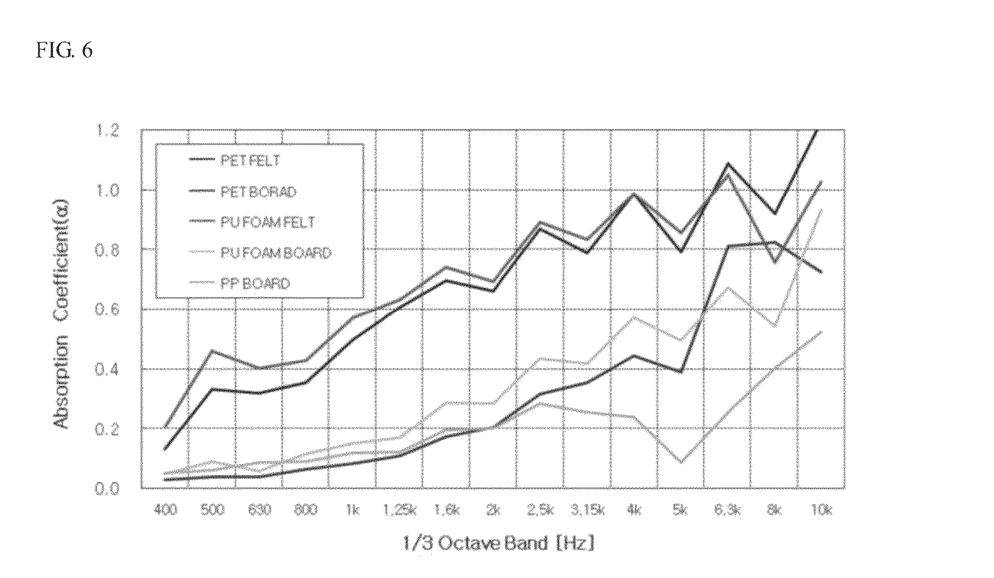
FIG. 6 is a graph showing absorption coefficients of a polypropylene board, a polyethylene terephthalate board, and a polyurethane board using a sound absorption test (α-Cabin).

FIG. 6 is a graph showing absorption coefficients of a polypropylene board, a polyethylene terephthalate board, and a polyurethane board using a sound absorption test (α-Cabin). The horizontal axis of FIG. 6 indicates a change in frequencies of sound as an octave band, and the vertical axis of FIG. 6 indicates the absorption coefficient. As the graph climbs upward, the sound absorbing property improves.

Since the values of the polyethylene terephthalate board and the polyurethane board are higher than the value of the polypropylene board in all frequency regions, sound blocking properties of the polyethylene terephthalate board and the polyurethane board are higher than that of the polypropylene board.

Based on the graphs, the sound absorbing layer includes polyurethane having excellent sound absorbing property as a main component, and the sound blocking layer includes polypropylene having excellent sound blocking property as a main component.

Figure 7:
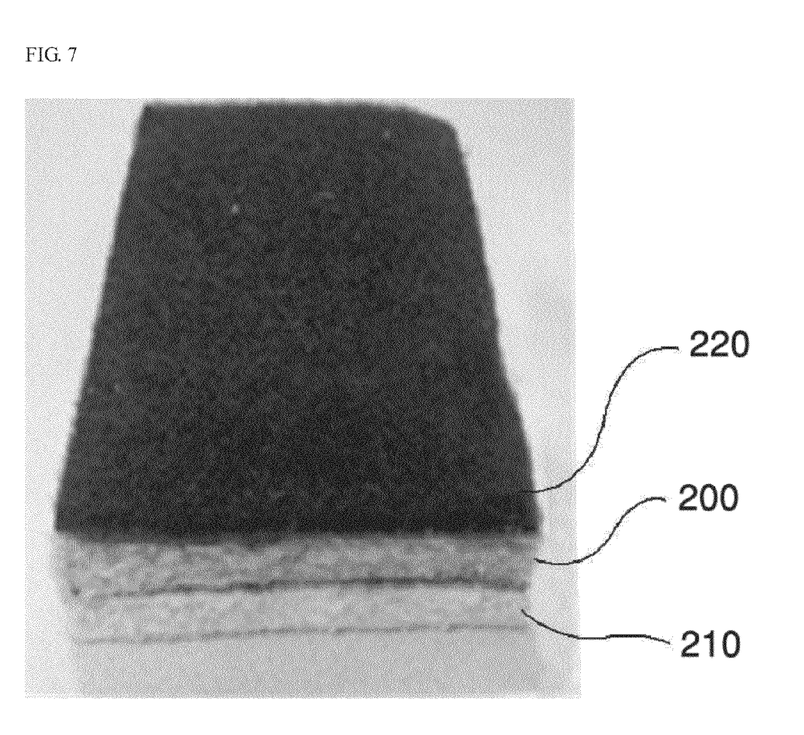
FIG. 7 is a photograph showing independent layers of a sound absorbing layer and a sound blocking layer according to the present disclosure, and a skin layer added for further improving durability of the present disclosure.
Figure 8:
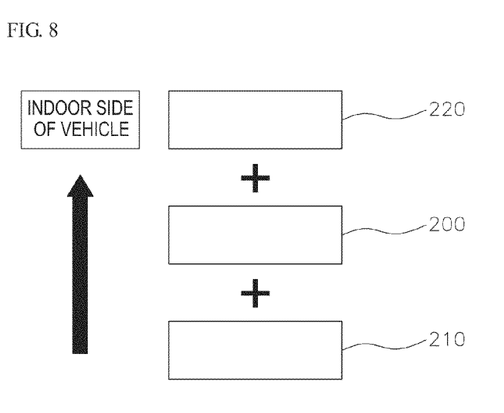
FIG. 8 is a schematic view of the present disclosure in which the sound absorbing layer, the sound blocking layer, and the skin layer are included.

In particular, any polyurethane foam may be applied to the sound absorbing layer, but a recycled polyurethane foam obtained from a waste seat and the like may be applied thereto. Furthermore, in order to maximize sound blocking and sound absorbing properties, the sound absorbing layer and the sound blocking layer may have a structure separated as independent layers. Here, a skin layer which is an exterior layer for improving the durability and enhancing the usability thereof may further be included. FIG. 7 is a photograph showing independent layers of a sound absorbing layer 210 and a sound blocking layer 200. A skin layer 220 may be added for further improving durability. FIG. 8 is a schematic view of the present disclosure showing the sound absorbing layer 210, the sound blocking layer 200, and the skin layer 220.

The sound absorbing layer 210 may have a relatively larger thickness, and the sound blocking layer 200 may have a relatively smaller thickness. The sound absorbing property is increased as the number of air layers is increased due to a large number of spaces in a material, and the sound blocking property is increased as the material gets harder without having a hole therein.

Figure 9:
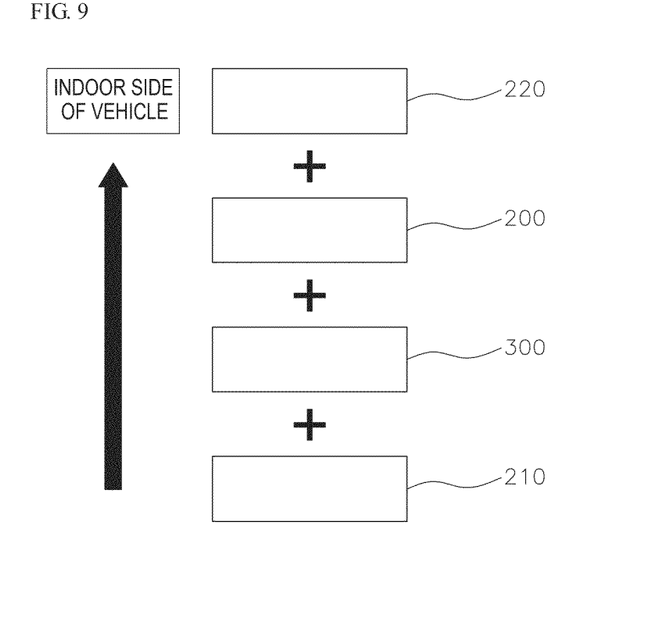
FIG. 9 is a schematic view of the present disclosure in which a film is included in between the sound absorbing layer and the sound blocking layer.

In addition, FIG. 9 is a schematic view of the present disclosure describing a film 300 in between the sound absorbing layer 210 and the sound blocking layer 200. In order to further improve the sound blocking property, the present disclosure includes a film 300 containing nylon, polypropylene, or the like having sound blocking property between the sound absorbing layer 210 and the sound blocking layer 200.

Figure 10:
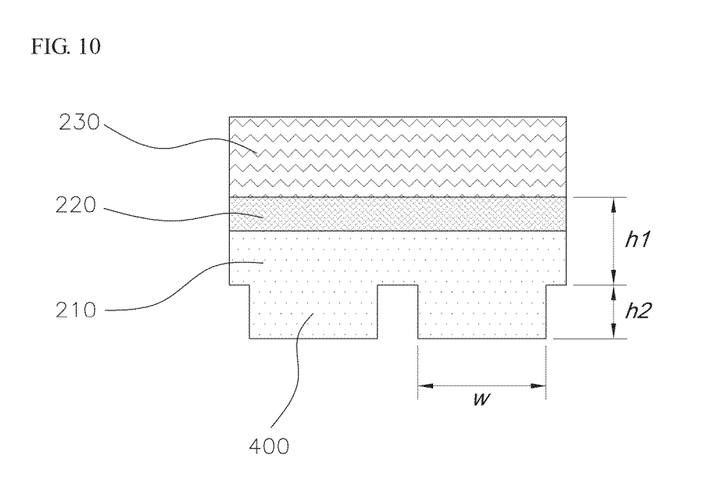
FIG. 10 is a schematic view including a bead positioned on the back of the sound absorbing layer.

Furthermore, in order to improve sound absorbing property and increase rigidity thereof, the present disclosure includes a bead positioned on one side surface of the sound absorbing layer 210 having a uniform thickness. FIG. 10 is a schematic view including a bead 400 positioned on the back of the sound absorbing layer 210. The bead increases rigidity of the sound absorbing layer 210 by increasing a section modulus of the sound absorbing layer and improving the sound absorbing property by increasing a surface area of sound absorbed.

A width w of the bead 400 may be from 10 mm to 40 mm and a height h2 thereof may be from 0.5 time to 2 times a base thickness h1 of the sound absorbing layer 210 and the sound blocking layer 200. As an example, when the base thickness h1 of the sound absorbing layer 210 and the sound blocking layer 200 is 1.6 mm, the height h2 of the bead 400 may be from 0.8 mm to 3.2 mm.

In accordance with another aspect, the present disclosure relates to a method of manufacturing a sound absorbing and sound blocking reinforced board for a vehicle.

Figure 11:
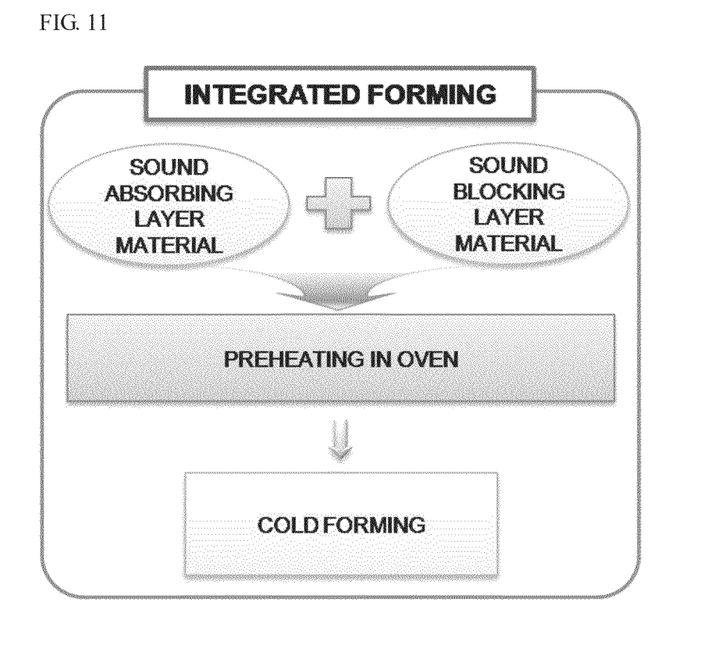
FIG. 11 is a schematic view of an integrated forming method.

FIG. 11 is a schematic view of an integrated forming method. A first step of the method manufactures a sound absorbing and sound blocking layer by binding a sound absorbing layer and a sound blocking layer, and then preheats and compresses the sound absorbing layer and the sound blocking layer in an oven. A second step manufactures a sound absorbing and sound blocking reinforced board by subjecting the sound absorbing and sound blocking layer to a cold forming process using a mold.

The sound absorbing layer may include a recycled polyurethane foam, a binding material, a web forming material, a rigid reinforcement material, and the like, and the sound blocking layer includes polypropylene, a rigid reinforcement material, and the like.

The preheating temperature of the oven at the first step may be from 170° C. to 230° C. or from 180° C. to 200° C. The preheating time may be from 30 seconds to 120 seconds. When the preheating temperature is less than 170° C., the compositions may not be preheated, and when the temperature thereof exceeds 230° C., the composition may melt. In addition, when the preheating time is less than 30 seconds, heat may not reach the inside of the composition, and when the preheating time exceeds 120 seconds, the preheating capacity may be saturated, leading to an increase in production costs as the preheating time is prolonged.

During cold forming at the second step, the mold temperature may be from 10° C. to 30° C., and the compression time from 30 seconds to 120 seconds. WIf the mold temperature during the cold forming is less than 10° C., it may be difficult to form due to an excessively low temperature. When the mold temperature exceeds 30° C., a shape of the formed article discharged may not be retained. Furthermore, when the compression time is less than 30 seconds, forming may not be sufficiently completed, and for the compression time exceeding 120 seconds, the costs are increased due to excessive compression.

Figure 12:
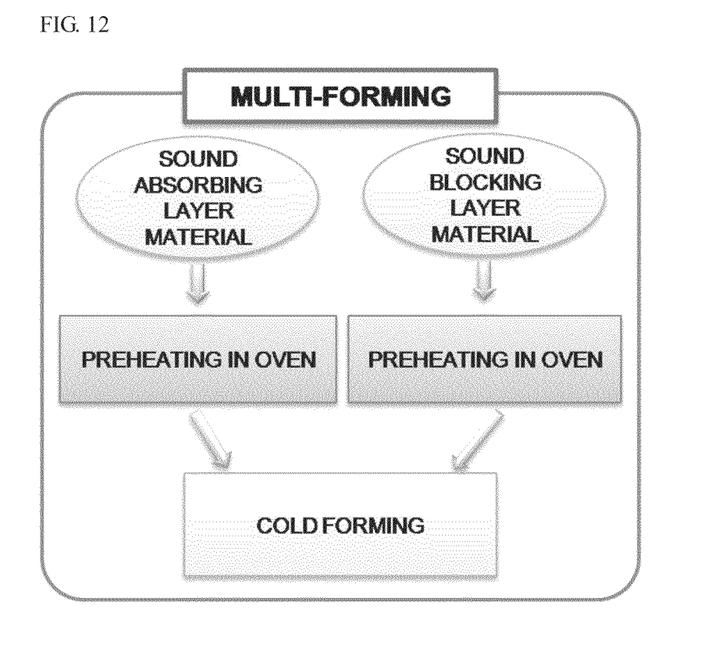
FIG. 12 is a schematic view of a multi-forming method.

FIG. 12 is a schematic view of a multi-forming method. In order to improve sound absorbing and sound blocking properties of the present disclosure, a multi-forming process can be used instead of the integrated forming process.

A first step of the method manufactures a sound absorbing and sound blocking layer by preheating and compressing a sound absorbing layer and a sound blocking layer, respectively, in an oven, and then binding the sound absorbing layer and the sound blocking layer. A second step manufactures a sound absorbing and sound blocking reinforced board by subjecting the sound absorbing and sound blocking layer to a cold forming process using a mold.

Here, the sound absorbing layer may include a recycled polyurethane foam, a binding material, a web forming material, a rigid reinforcement material, and the like. The sound blocking layer may include polypropylene, a rigid reinforcement material, and the like.

Further, if the sound absorbing layer and the sound blocking layer are preheated independently in the oven in the first step, the thicknesses of the sound absorbing layer and the sound blocking layer is controlled, in certain embodiments, the thickness of the sound absorbing layer is larger than that of the sound blocking layer.

The thickness of the sound absorbing layer prior to compression is from 10 to 30 mm, and the thickness thereof after compression is from 3 to 10 mm. The preheating temperature may be from 170° C. to 230° C., and the preheating time may be from 30 seconds to 120 seconds.

The thickness of the sound blocking layer prior to compression may be from 10 mm to 30 mm, and the thickness thereof after compression from 2 mm to 5 mm. Further, the preheating temperature may be from 170° C. to 230° C., and the preheating time may be from 30 seconds to 120 seconds.

When the preheating temperature of the sound absorbing layer and the sound blocking layer is less than 170° C., the compositions may not be preheated, and when the temperature thereof exceeds 230° C., the composition may be melted. In addition, when the preheating time is less than 30 seconds, heat may not reach the inside of the composition, and when the preheating time exceeds 120 seconds, the preheating capacity may be saturated, thereby increasing production costs as the preheating time being prolonged.

The thicknesses of the sound absorbing layer and the sound blocking layer prior to the cold forming are 3 to 10 mm and 2 to 5 mm, respectively. However, the completed product after the cold forming thickness may be from 1 mm to 3 mm, mold temperature may be from 10° C. to 30° C., and the compression time may be from 30 seconds to 120 seconds. When the sound absorbing layer and the sound blocking layer are subjected to cold forming, the skin layer 220 including a nonwoven fabric and the like may be added to one side of the sound blocking layer.

Here, when the mold temperature during the cold forming is less than 10° C., the article may not be performed due to an excessively low temperature, and when the mold temperature exceeds 30° C., the shape of the formed article discharged may not be retained. When the compression time is less than 30 seconds, forming may not be sufficiently completed, and when the compression time exceeds 120 seconds, the costs may be increased due to excessive compression.

The present disclosure may further include a film 300 containing nylon, polypropylene, or the like, which is positioned between the sound absorbing layer and the sound blocking layer, at the second step. The thickness of the film 300 after cold forming may be from 0.2 mm to 0.4 mm, and the weight of the film may be from 0.1 g to 0.2 g based on 1 m across and 1 m long.

In addition, in order to improve the sound absorbing property of the sound absorbing and sound blocking reinforced board for a vehicle and increase the rigidity thereof, the present disclosure may include a bead 400 or bead positioned on one side surface of the sound absorbing layer.

The width w of the bead may be from 10 mm to 40 and the height h2 thereof may be from 0.5 time to 2 times the base thickness h1 of the sound absorbing layer 210 and the sound blocking layer 200. As an example, when the base thickness h1 of the sound absorbing layer 210 and the sound blocking layer 200 is 1.6 mm, the height h2 of the bead 400 may be from 0.8 mm to 3.2 mm

What is claimed is:

1. A sound absorbing and sound blocking reinforced board for a vehicle, comprising:
    a sound absorbing layer; and
    a sound blocking layer,
    wherein the sound absorbing layer comprises:
        a recycled polyurethane foam;
        a binding material;
        a web forming material; and
        a rigid reinforcement material,
        wherein the binding material is a low melting polyethylene terephthalate, the web forming material is a polyethylene terephthalate or polypropylene, and the rigid reinforcement material is a kenaf, and
        the recycled polyurethane foam, the low melting polyethylene terephthalate, the polypropylene, and the kenaf in the sound absorbing layer are present in amounts from 40% by weight to 60% by weight, from 5% by weight to 20% by weight, from 5% by weight to 40% by weight, and from 10% by weight to 40% by weight, respectively, based on a total weight of the sound absorbing layer; and
    the sound blocking layer comprises:
        a polypropylene; and
        a kenaf,
        wherein the polypropylene and the kenaf in the sound blocking layer are present in amounts from 30% by weight to 70% by weight and from 30% by weight to 70% by weight. respectively, based on a total weight of the sound blocking layer.

2. The board of claim 1, wherein the recycled polyurethane foam has a cell structure having a size from 1 mm to 5 mm, the low melting polyethylene terephthalate has a fiber structure having a size from 4 denier to 7 denier, the polypropylene in the sound absorbing layer has a fiber structure having a size from 4 denier to 9 denier, and the kenaf in the sound absorbing layer has a fiber structure.

3. The board of claim 1, wherein a weight ratio of the sound absorbing layer to the sound blocking layer is 1:0.3 to 2.0.

4. The board of claim 1, further comprising:
    a film containing a nylon or a polypropylene positioned between the sound absorbing layer and the sound blocking layer.

5. The board of claim 1, further comprising:
    a bead positioned on one side surface of the sound absorbing layer.

6. A method of manufacturing a sound absorbing and sound blocking reinforced board for a vehicle, the method comprising:
    a first step of manufacturing a sound absorbing and sound blocking layer by binding a sound absorbing layer and a sound blocking layer, and then preheating and compressing the sound absorbing layer and the sound blocking layer in an oven; and
    a second step of manufacturing the sound absorbing and sound blocking reinforced board by subjecting the sound absorbing and sound blocking layer to a cold forming process using a mold.

7. A method of manufacturing a sound absorbing and sound blocking reinforced board for a vehicle, the method comprising:
    a first step of manufacturing a sound absorbing and sound blocking layer by preheating and compressing a sound absorbing layer and a sound blocking layer, respectively, in an oven, and then binding the sound absorbing layer and the sound blocking layer; and
    a second step of manufacturing a sound absorbing and sound blocking reinforced board by subjecting the sound absorbing and sound blocking layer to a cold forming process using a mold.

8. The method of claim 6, wherein the sound absorbing layer comprises a recycled polyurethane foam, a binding material, a web forming material, and a rigid reinforcement material.

9. The method of claim 7, wherein the sound absorbing layer comprises a recycled polyurethane foam, a binding material, a web forming material, and a rigid reinforcement material.

* * * * *